(No Model.)
J. T. PEDERSEN.
SECONDARY BATTERY.
No. 398,075. Patented Feb. 19, 1889.
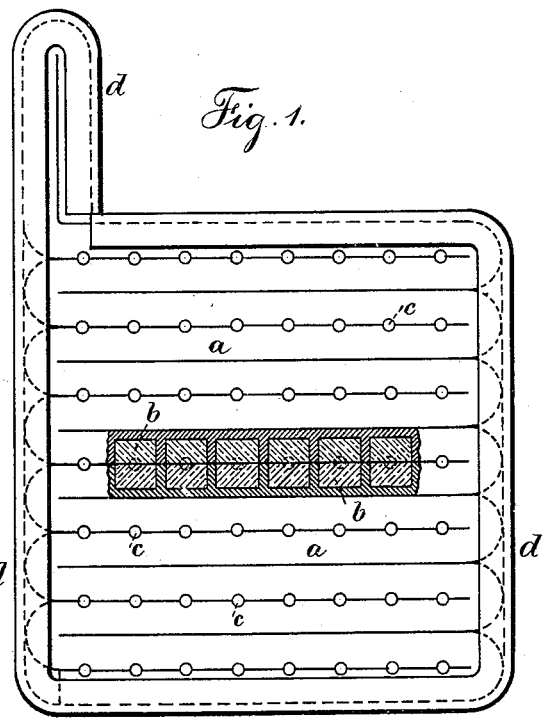
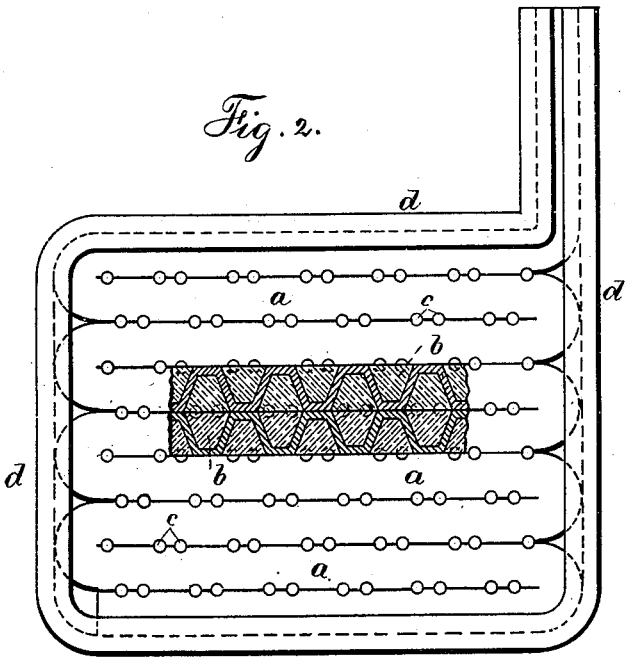
Witnesses:
J. Staib
Chas. H. Smith
Inventor:
Johannes Fr. Pedersen
per Lemuel W. Serrell Atty.

UNITED STATES PATENT OFFICE.

JOHANNES TH. PEDERSEN, OF NEW YORK, N. Y.

SECONDARY BATTERY.

SPECIFICATION forming part of Letters Patent No. 398,075, dated February 19, 1889.

Application filed July 30, 1888. Serial No. 281,437. (No model.)

*To all whom it may concern:*

Be it known that I, JOHANNES TH. PEDERSEN, of the city, county, and State of New York, have invented an Improvement in Secondary or Storage Batteries; and the following is declared to be a description of the same.

Before my invention difficulty was experienced in the manufacture of the electrodes or elements for secondary or storage batteries, because the red lead or active element of the battery in its electrical conditions was liable to shift its position, and it has been difficult to so confine the same that its efficiency was insured; and the object of my invention is to overcome the aforesaid difficulties and to improve the electrode or element so as both to insure a large active surface within a comparatively small space and slight weight, and to so confine the active material that it shall be impossible for the same to shift its position under the electrical conditions of charging and discharging the battery.

My invention consists in an electrode or element for a secondary or storage battery, which element is a plate formed from a strip or bar of rolled or cast lead which is bent upon itself to form a series of flattened horizontal convolutions, which convolutions are bound together with an edge strip to form one of the plates of a battery, and the bar or strip from which the convolutions are formed is made with pockets or holes formed or pressed into or through the strip and with grooves across the surface of the strip opening into the pockets, and these pockets and their grooves are to be filled with the active material of the battery before the strip or bar is bent to form the flattened horizontal convolutions, so that when thus bent up the active material is confined within the opposing surface of the bent strip, and access is had to said active material through the cross-grooves.

In the drawings, Figure 1 is an elevation of a plate and a partial section through two horizontal portions of the strip or bar. Fig. 2 is an elevation of a plate and a section through two of the horizontal portions of the strip or bar, showing a modification of the pockets. Fig. 3 is a cross-section through the strip or bar and one of the pockets and its groove, and Fig. 4 is a cross-section through the strip of lead which forms the binding-edge.

The electrode or element for the secondary or storage battery is composed of a strip or bar, $a$, of rolled or cast lead, and in one or more of the surfaces of said bar there are pockets or holes at $b$, the upper edges of which nearly touch, so that said holes are close together in a continuous row along one or more of the surfaces of said strip, and there are grooves at $c\ c'$, made across the strip between its outer edges and the inner side edges of the pockets or holes at $b$, and said strip $a$ in cross-section is preferably of rectangular shape—namely, of slightly greater width than depth, as will be seen by the cross-section, Fig. 3. Said strip or bar $a$ is made of any desired length, and in forming the electrode or element said strip is bent upon itself to form a series of flattened horizontal convolutions, which convolutions are of any desired length, according to the size of the plate to be used.

The pockets or holes $b$, that are formed in or through the strip or bar $a$, are, before the same is bent to shape, filled with red lead or the active material of the battery, and when said strip is bent to form said convolutions this active element is confined between the opposing surfaces of the strip, and cannot escape or get away from its position with its changing consistency due to the electric charge and discharge of the battery. The plate formed by the bar $a$, being bent upon itself into a series of flattened horizontal convolutions, is bound together or confined around its bent edges by the grooved edge strip $d$, which is passed around the plate, as will be seen from Figs. 1 and 2 of the drawings; and it is preferable after said strip $d$ is bent to place that the same and the edges of the strip $a$ should be compressed in any desired manner, so as to consolidate the surfaces of the lead to form a homogeneous mass, so that the same cannot separate or come apart in use.

The pockets at $b$ in the convoluted strip, Fig. 1, are shown as formed in one side of the strip $a$ only, said pockets having vertical bounding walls. The pockets at $b$ in Fig. 2 are shown as pressed into opposite sides of the strip $a$ alternately, two of said walls of said pockets being inclined or V-shaped lengthwise with the strip and the other two or outer walls being vertical, and it is preferable, in bending the strip $a$ into the convoluted forms shown in both Figs. 1 and 2, to bring the pockets opposite each other in the portions of the strip as the same is convoluted, so that thereby, as shown in the sectional portions of said figures, masses of active element or material are brought together, and when said plates are in place in the battery access to the active element or material is obtained through the grooves $c\ c'$, which grooves, when the strip is convoluted, are brought in opposition to form holes or openings through the sides of the plate.

I claim as my invention—

1. A secondary-battery element or electrode formed from a strip or bar of rolled or cast lead bent upon itself to form a series of flattened horizontal convolutions, and having pockets or holes formed or pressed into or through the surface of said strip to contain the active material of the battery, and having grooves or openings through which access is obtained to the active element, substantially as set forth.

2. A secondary-battery element or electrode formed from a strip or bar of rolled or cast lead bent upon itself to form a series of flattened horizontal convolutions, and having pockets or holes formed or pressed into the surface of said strip to contain the active material of the battery, and having grooves or openings through which access is obtained to the active element, and a strip passing around the bent or convoluted ends of the strip or bar and confining the same to place, and forming a homogeneous plate, substantially as set forth.

3. A secondary-battery element or electrode formed from a strip or bar of rolled or cast lead bent upon itself to form a series of flattened horizontal convolutions, pockets or holes formed or pressed into or through one or more of the opposing surfaces of said strip, said pockets being adapted to receive the active element of the battery, there being cross-grooves which, when brought into opposition to each other, form openings through the surface of the convoluted strip, the pockets in said strip being also brought into opposition to connect the surfaces of the active material, substantially as and for the purposes set forth.

Signed by me this 20th day of July, 1888.

JOHANNES TH. PEDERSEN.

Witnesses:
   GEO. T. PINCKNEY,
   HAROLD SERRELL.